No. 677,712. Patented July 2, 1901.
F. W. STAPF.
SPIRAL JOINTED SHEET METAL PIPE.
(Application filed May 3, 1901.)
(No Model.)
Fig. 1,
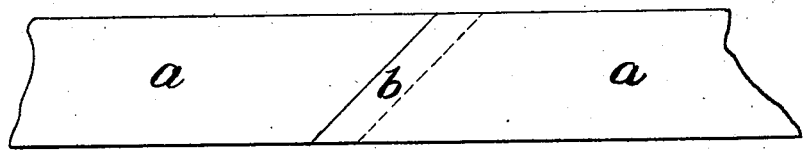
Fig. 2,
Fig. 3,
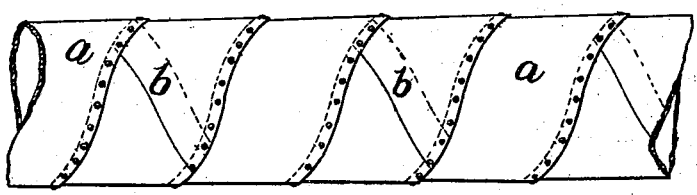
WITNESSES:
D. H. Hayward
J. H. Barnes
INVENTOR
Frederick W. Stapf
BY
Henry D. Williams
ATTORNEY
THE NORRIS PETERS CO., PHOTO-LITHO., WASHINGTON, D. C.

UNITED STATES PATENT OFFICE.

FREDERICK W. STAPF, OF BROOKLYN, NEW YORK, ASSIGNOR TO JOHN A. WILBUR, OF NEW YORK, N. Y.

SPIRAL-JOINTED SHEET-METAL PIPE.

SPECIFICATION forming part of Letters Patent No. 677,712, dated July 2, 1901.

Application filed May 3, 1901. Serial No. 58,627. (No model.)

*To all whom it may concern:*

Be it known that I, FREDERICK W. STAPF, a citizen of the United States, and a resident of the borough of Brooklyn, in the city of New York and State of New York, have invented new and useful Improvements in Spiral-Jointed Sheet-Metal Pipes, of which the following is a specification, reference being had to the accompanying drawings, forming part thereof.

This invention relates to spiral-jointed sheet-metal pipe; and it consists of an improved construction wherein the joints of the pipe which are the end joints or butt-joints of the blank from which the pipe is made are arranged on lines oblique to the side joints thereof and on lines oblique to the longitudinal lines of the pipe, as hereinafter fully described, whereby these joints are so disposed as to depart considerably from the lines of greatest weakness of the pipe and the pipe is greatly stiffened and strengthened.

I will now describe a construction embodying my invention, illustrated in the accompanying drawings, and will thereafter point out my invention in the claims.

Figure 1 is a face view of a portion of a blank from which spiral-jointed sheet-metal pipe embodying my invention is made. Fig. 2 is an edge view of the same. Fig. 3 is an elevation of a portion of the completed pipe.

Flat sheet-metal strips of the desired width from which the pipe is made are first cut or shaped at the ends that are to be joined together in the completed pipe, so that the end edges will be oblique to the side edges, and the oblique ends are preferably scarfed or beveled oppositely, so that when these ends are placed together they will overlap with a joint of considerably greater width than the thickness of the blank. The oblique and scarfed edges are then welded together, producing a blank of the desired length which will be of substantially uniform thickness in all parts and in which the welded joints will extend obliquely across the face of the blank. A portion of such a blank $a$ is shown in Figs. 1 and 2 with a single welded joint $b$ therein. The blank thus made is ready to be wound into cylindrical form, with the side edges of the blank overlapping on helical or spiral lines, and this may be accomplished and the overlapping spiral edges riveted together in a suitable machine or apparatus for making spiral-jointed pipe or by hand. The spiral-jointed pipe thus produced is shown in Fig. 3, the riveted spiral joints being marked $c$.

It will be observed that the oblique-welded joints $b$ become in the completed pipe spirally-shaped joints extending in the reverse direction of the continuous riveted spiral joint, and the pipe is thus made up of a hollow cylinder or tube of metal having a continuous spiral riveted joint and short spiral welded joints, the spiral welded joints being oblique to the spiral riveted joint and oblique to longitudinal lines on the surface of the cylinder. It is a well-known fact that the bursting or breaking or opening of pipes under pressure usually occurs on longitudinal lines and that where welded joints are on longitudinal lines or nearly longitudinal lines the bursting or opening frequently occurs at these welded joints. With my improved construction the welded joints are not on longitudinal lines, but, on the contrary, are on spiral lines extending at a considerable angle to the longitudinal lines of the pipe, and in consequence thereof the opening of the welded joints under any of the conditions of use is practically impossible and the pipe is of great strength and capable of resisting great pressures and strains. With my improved construction the welded joints are not only so arranged as to depart widely in direction from the lines of greatest weakness of the pipe, but their longitudinal section or sections on these lines of greatest weakness are of considerable length, and the lengths of the welded joints themselves are very much greater than the width of the blank or the distance between adjacent parts of the riveted joint, and the very considerable arching of the metal at the welded joints and the fact that this arching of the metal is on lines disposed at a considerable angle to the lines of the joints bring about a strengthening of the welded joints such that there is no probability of opening at the welded joints under any conditions of use and also a considerable strengthening and stiffening of the pipe as a whole.

The particular angle of obliquity of the welded joint may of course be varied without departing from my invention, and various modifications may be made in the particular construction shown within the spirit and scope of my invention.

What I claim, and desire to secure by Letters Patent, is—

1. A sheet-metal pipe having its joints all in spiral lines and at oblique angles to each other at points of intersection and oblique to longitudinal lines of the pipe, substantially as set forth.

2. A sheet-metal pipe having a continuous riveted spiral joint and interrupted welded spiral joints, the riveted joints being at oblique angles to the spiral joint at points of intersection and oblique to longitudinal lines of the pipe, substantially as set forth.

Signed at New York, N. Y., this 1st day of May, 1901.

FREDERICK W. STAPF.

Witnesses:
HENRY D. WILLIAMS,
HERBERT H. GIBBS.